US010720618B2

United States Patent
Long et al.

(10) Patent No.: US 10,720,618 B2
(45) Date of Patent: Jul. 21, 2020

(54) END PLATE FOR BATTERY MODULE AND BATTERY MODULE

(71) Applicant: Contemporary Amperex Technology Co., Limited, Ningde, Fujian (CN)

(72) Inventors: Chao Long, Ningde (CN); Huabin Zou, Ningde (CN); Derong Wang, Ningde (CN); Linggang Zhou, Ningde (CN); Cong Bao, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 16/358,867

(22) Filed: Mar. 20, 2019

(65) Prior Publication Data

US 2019/0305273 A1 Oct. 3, 2019

(30) Foreign Application Priority Data

Mar. 30, 2018 (CN) .......................... 2018 1 0290545

(51) Int. Cl.
*H01M 2/10* (2006.01)
*H01M 10/04* (2006.01)

(52) U.S. Cl.
CPC ..... *H01M 2/1077* (2013.01); *H01M 10/0481* (2013.01)

(58) Field of Classification Search
None
See application file for complete search history.

(56) References Cited

U.S. PATENT DOCUMENTS

2006/0093890 A1* 5/2006 Steinbroner .......... H01M 8/248
429/430

FOREIGN PATENT DOCUMENTS

| CN | 1992385 A | 7/2007 |
|---|---|---|
| CN | 102110799 A | 6/2011 |
| CN | 206574766 U | 10/2017 |
| CN | 206878067 U | 1/2018 |
| EP | 1760806 A2 | 3/2007 |
| EP | 1990861 A1 | 11/2008 |

(Continued)

OTHER PUBLICATIONS

The extended European search report dated Aug. 1, 2019 for European Application No. 19164733.8, 5 pages.

(Continued)

*Primary Examiner* — Wyatt P McConnell
(74) *Attorney, Agent, or Firm* — Law Offices of Liaoteng Wang

(57) ABSTRACT

The disclosure relates to an end plate and a battery module. The end plate comprises an end plate body, which has an inner surface and an outer surface that are opposed in a thickness direction of the end plate body, the outer surface is engaged with a fixing band for the battery module; and a limiting assembly, which is disposed on the outer surface, the limiting assembly includes a fixed clamping member and a movable clamping member which are spaced apart from each other in a height direction of the end plate body and are used in cooperation with each other. A clamping space is formed between the fixed clamping member and the movable clamping member. The movable clamping member can make room for the fixing band so that the fixing band enters the clamping space by the movable clamping member and is limited within the clamping space.

12 Claims, 9 Drawing Sheets

(56) References Cited

FOREIGN PATENT DOCUMENTS

| JP | 2003323874 A | 11/2003 |
|----|--------------|---------|
| JP | 2013020740 A | 1/2013  |

OTHER PUBLICATIONS

The first Office Action and search report dated Apr. 22, 2020 for Chinese Application No. 201810290545.9, 6 pages.

\* cited by examiner

END PLATE FOR BATTERY MODULE AND BATTERY MODULE

CROSS-REFERENCE TO RELATED APPLICATION

This application is based on and claims priority to Chinese Patent Application No. 201810290545.9 filed on Mar. 30, 2018, which is incorporated herein by reference in its entirety.

TECHNICAL FIELD

The disclosure relates to the technical field of battery, and in particular, to an end plate for a battery module and a battery module.

BACKGROUND

Nowadays, the conventional battery module generally includes a battery stack which is formed of a plurality of stacked batteries and two end plates which are provided on the two sides of the battery stack. The end plates on the two sides are respectively fixed to the two side plates by welding to resist the expansion force from the battery.

With the increasingly fierce competition in the battery system industry, for the sustainable development of enterprises, one direction lies in developing lower cost battery systems to improve the competitiveness of enterprises. Therefore, the battery module in the prior art is gradually developed into a non-module structure. Compared with the conventional battery module structure, said module-less structure removes the side plates connecting the two end plates. Due to the removal of the side plates, there is accordingly no connection between the side plates and the end plates to resist the expansion force from the battery. Therefore, in order to resist the expansion force from the batteries, the non-module structure usually employs a fixing band to clamp the battery stack and resist the end plates.

Since the conventional end plate and the side plate are fixed by welding, the conventional end plate can satisfy the requirement of welding with the side plate. When the side plate is removed and the fixing band is used in cooperation with the end plate to resist the expansion force from the battery, the position of the fixing band on the end plate is uncertain because the fixing band and the end plate are fixed only by the tension of the fixing band itself. Therefore, the requirement of resisting the expansion force from the individual batteries cannot be satisfied.

Therefore, there is a need for a new end plate and battery module for the battery module.

SUMMARY

Embodiments of the disclosure provide an end plate for a battery module and a battery module, wherein the end plate can limit the position at which the fixing band is connected to the end plate, can prevent the movement of the fixing band, and can satisfy the requirement of resisting the expansion force from the batteries.

According to an embodiment of the disclosure, there is provided an end plate for a battery module. The end plate comprises an end plate body, which has an inner surface and an outer surface that are opposed to each other in a thickness direction of the end plate body, wherein the outer surface is engaged with a fixing band for the battery module; and a limiting assembly, which is disposed on the outer surface, wherein the limiting assembly includes a fixed clamping member and a movable clamping member which are spaced apart from each other in a height direction of the end plate body and are used in cooperation with each other, a clamping space for receiving the fixing band is formed between the fixed clamping member and the movable clamping member, and the movable clamping member can make room for the fixing band so that the fixing band enters the clamping space by the movable clamping member and is limited within the clamping space.

According to one aspect of the embodiment of the disclosure, the fixed clamping member protrudes from the end plate body in the thickness direction and is integral with the end plate body.

According to one aspect of the embodiment of the disclosure, a connecting portion is provided on the outer surface, and the movable clamping member is detachably or elastically connected with the connecting portion.

According to an aspect of the embodiment of the disclosure, the movable clamping member is detachably connected with the connecting portion, a plug-in slot is provided in the connecting portion, the movable clamping member has a base which is shaped to match the plug-in slot, and the movable clamping member is detachably connected with the connecting portion by the base and the plug-in slot.

According to an aspect of an embodiment of the disclosure, the connecting portion further has a limiting slot communicating with the plug-in slot, the movable clamping member further comprises a stopper connected to the base, the stopper has two end portions which are opposite, wherein one of the end portions is elastically connected to the base and the other of the end portions extends in a direction away from the base, and the stopper is engaged with the limiting slot to limit movement of the movable clamping member in a width direction of the end plate body.

According to an aspect of the embodiment of the disclosure, the number of the limiting assemblies is two and the two limiting assemblies are spaced apart from each other in the height direction, and the movable clamping member is located at a side of the end plate body near the end face in the height direction.

According to one aspect of the embodiment of the disclosure, guide inclined surfaces are formed at the two ends of the end plate body in the height direction; and/or recesses are formed at the two ends of the end plate body in the height direction to provide a force applying space for a force applying tool According to an aspect of the embodiment of the disclosure, a portion of the outer surface that is fitted with the fixing band is an arc surface.

According to an aspect of the embodiment of the disclosure, the arc surface includes a horizontal segment which is located in the middle and component segments which are respectively connected to two sides of the horizontal segment, each of the component segments includes an inclined segment, an arc transition segment, and a vertical segment which are successively arranged in a width direction of the end plate body, the inclined segment is connected to the horizontal segment.

According to an aspect of the embodiment of the disclosure, an adhesive overflow groove is provided on the inner surface and extends in the height direction.

According to an aspect of the embodiment of the disclosure, the end plate body and the fixed clamping member are molded by die casting, and a weight reducing groove and/or a reinforcing rib is provided on the outer surface.

The end plate for the battery module according to the embodiment of the disclosure includes an end plate body and a limiting assembly. The end plate body has an inner surface and an outer surface which are opposite in the thickness direction of the end plate body. The limiting assembly is provided on the outer surface. The limiting assembly includes a fixed clamping member and a movable clamping member which are spaced apart from each other in the height direction of the end plate body and are used in cooperation with each other. The clamping space for receiving the fixing band is formed between the fixed clamping member and the movable clamping member. When the end plate is applied into the battery module, the movable clamping member can make room for the fixing band, so that the fixing band can enter the clamping space by the movable clamping member and can limit the movement of the fixing band in the height direction of the end plate body. Therefore, movement of the fixing band is prevented and consequently the requirement of resisting the expansion force from the batteries is satisfied.

According to another embodiment of the disclosure, there is provided a battery module. The battery module comprises a battery stack, which includes a plurality of batteries that are disposed to be stacked; two end plates as described above, wherein the two end plates are spaced apart from each other and are disposed to sandwich the battery stack; and a fixing band, which is disposed around the battery stack and the two end plates and is engaged with the outer surface, wherein the fixing band is received in the clamping space.

BRIEF DESCRIPTION OF THE DRAWINGS

Features, advantages, and technical effects of exemplary embodiments of the disclosure will be described below with reference to the accompanying drawings.

In the drawings, the same reference numerals are used to indicate the same components. The drawings are not drawn to the actual scale.

DETAILED DESCRIPTION

Figure 1:
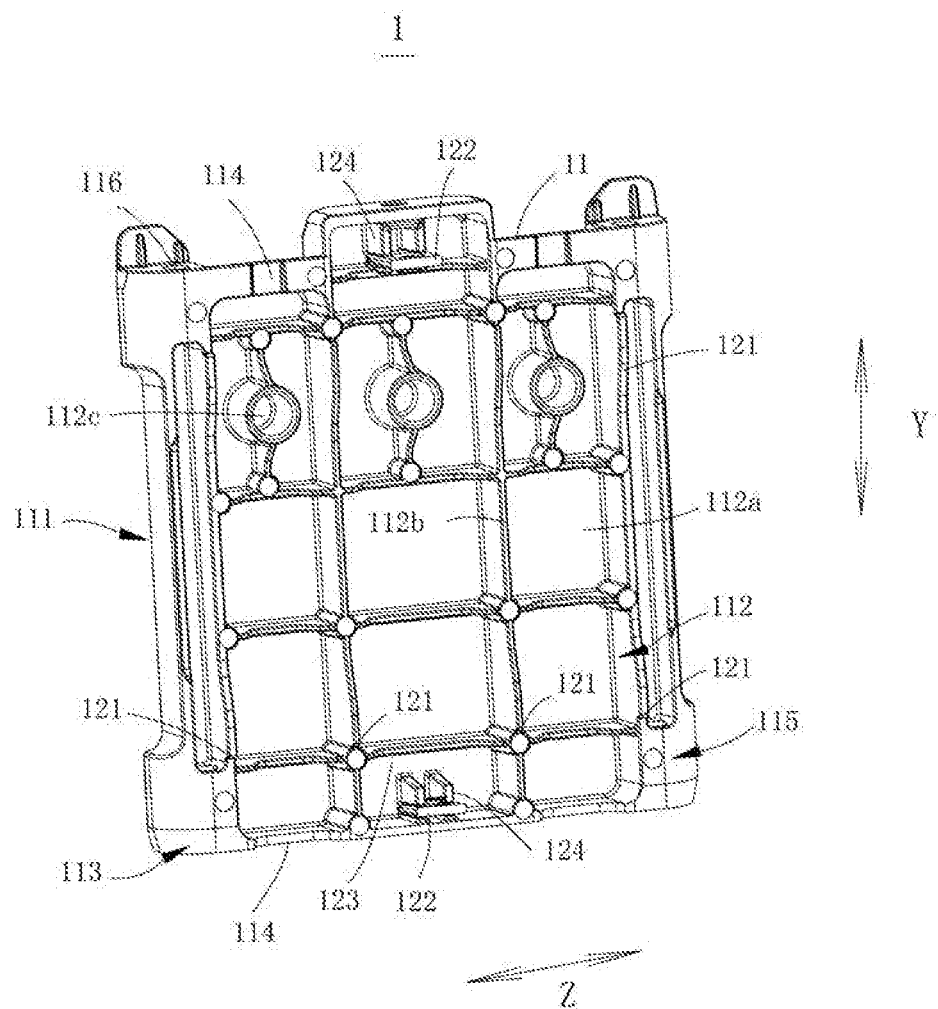
FIG. 1 shows a schematic view of the overall structure of an end plate for a battery module according to an embodiment of the disclosure.

Features and exemplary embodiments according to various aspects of the disclosure are described in detail below. In the following detailed description, numerous specific details are set forth to provide comprehensive understanding of the disclosure. However, it will be apparent to the skilled in the art that the disclosure may be practiced without some of the specific details. The following description of the embodiments is merely to provide a better understanding of the disclosure. In the figures and the following description, at least some of the well-known structures and techniques are not shown, to avoid unnecessarily obscuring the disclosure. Further, for clarity, the dimension of some of the structures may be enlarged. Furthermore, the features, structures, or characteristics described hereinafter may be combined in any suitable manner in one or more embodiments.

The orientation terms appearing in the following description refer to the directions shown in the drawings, and are not intended to limit the specific structure of the end plate and the battery module of the disclosure. In the description of the disclosure, it should be noted that, unless otherwise stated, the terms "mount" and "connect" are to be understood broadly, for example, they may be fixed connection or detachable connection or integral connection; or may be direct connection or indirect connection. The specific meaning of the above terms in the disclosure may be understood by the skilled in the art based on the specific situation.

The end plate according to embodiments of the disclosure can be applied into the battery module to use with the fixing band of the battery module. Meantime, the end plate can limit the position where the fixing band is connected thereto, can avoid the change in the position of the fixing band and the end plate in the battery module, and can better resist the expansion force from the individual batteries in the battery stack.

In order to better understanding of the disclosure, an end plate 1 for a battery module and a battery module according to an embodiment of the disclosure will be described in detail with reference to FIGS. 1 to 3.

Figure 2:
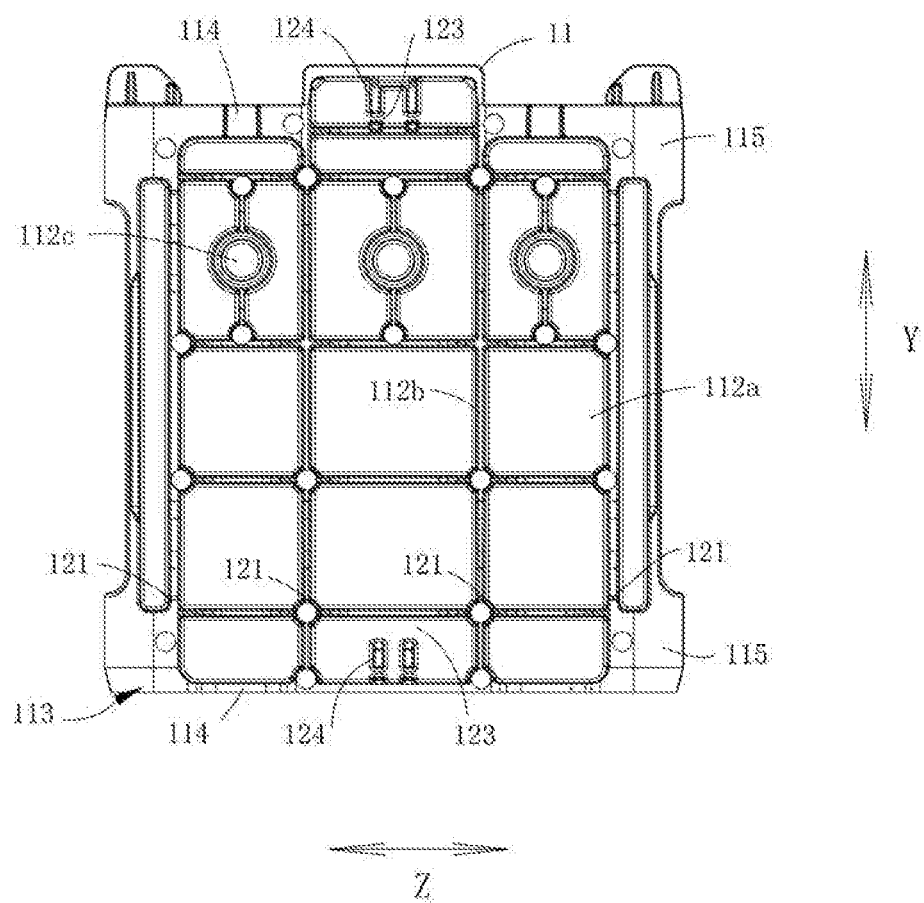
FIG. 2 shows a schematic view of the partial structure of an end plate for a battery module according to an embodiment of the disclosure.
Figure 3:
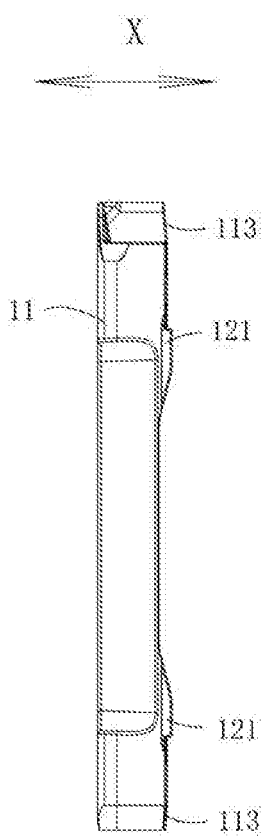
FIG. 3 shows a side view of the structure shown in FIG. 2.

FIG. 1 shows a schematic view of the overall structure of the end plate 1 for the battery module according to an embodiment of the disclosure, FIG. 2 shows a schematic view of the partial structure of the end plate for the battery module according to the embodiment of the disclosure, and FIG. 3 shows a side view of the structure shown in FIG. 2.

As shown in FIGS. 1 to 3, the end plate 1 according to the embodiment of the disclosure includes an end plate body 11 and a limiting assembly. The end plate body 11 has an inner surface 111 and an outer surface 112 which are opposite to each other in the thickness direction X of the end plate body 11. The outer surface 112 is use with the fixing band for the battery module. The limiting assembly is disposed on the outer surface 112. The limiting assembly includes a fixed clamping member 121 and a movable clamping member 122, which are spaced apart from each other in the height direction Y of the end plate body 11 and are used in cooperation with each other. A clamping space 123 for receiving the fixing band is formed between the fixed clamping member 121 and the movable clamping member 122. The movable clamping member 122 can make room for the fixing band, so that the fixing band can enters the clamping space 123 and can be limited by the clamping space 123.

The above and the following "make room for" means that the movable clamping member 122 can move relative to the end plate body 11 to evade the fixing band and make room for the fixing band so that the fixing band can smoothly enter the clamping space 123 and can be limited within the clamping space 123.

Specifically, the end plate body 11 has a plate-like shape with a certain thickness. Said thickness is not limited to a specific value, and is set according to the size and model requirements of the applied battery module. As an optional embodiment, the fixed clamping member 121 protrudes from the end plate body 11 in the thickness direction X of the end plate body 11 and is integral with the end plate body 11. The end plate body 11 and the fixed clamping member 121 is preferably molded by die casting. The method of die casting not only facilitates the processing, but also ensures connection strength between the fixed clamping member 121 and the end plate body 11 and the overall load-bearing requirement of the end plate.

Particularly, the fixed clamping member 121 may be a protrusion protruding from the end plate body 11 in the thickness direction X of the end plate body 11. In this embodiment, the number of fixed clamping members 121 of each limiting assembly may be two or more. The two or more fixed clamping members 121 are preferably provided evenly in the width direction Z of the end plate body 11. Each fixed clamping member 121 extends a certain height in the height direction Y of the end plate body 11, to ensure the overall load-bearing requirement of the fixed clamping member 121.

Figure 4:
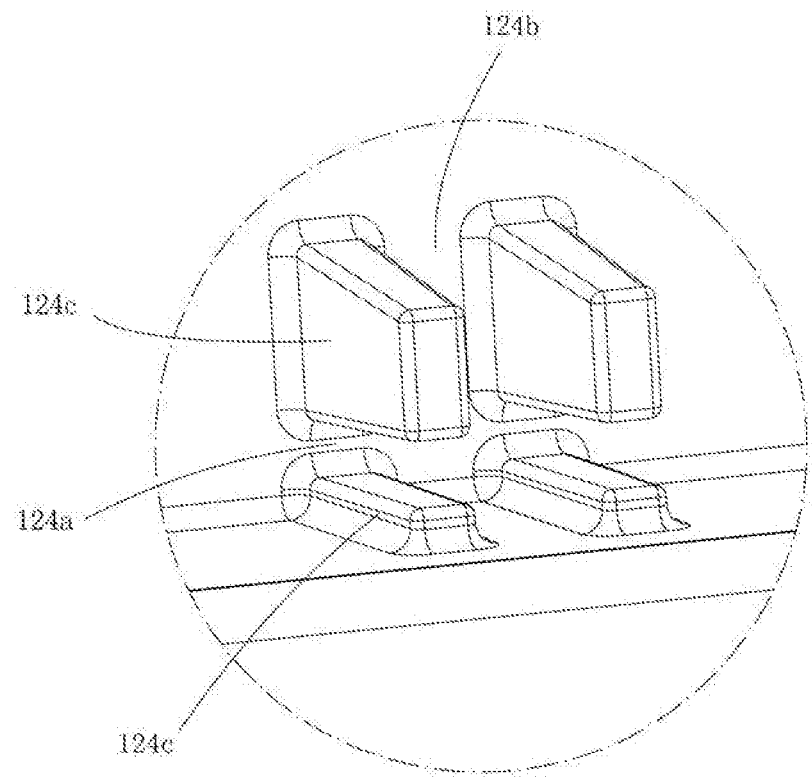
FIG. 4 shows a schematic view of the structure of a connecting portion according to an embodiment of the disclosure.

FIG. 4 shows a schematic view of the structure of a connecting portion 124 according to an embodiment of the disclosure. In order to facilitate the connection with the movable clamping member 122, as an optional embodiment, with reference to FIG. 4, a connecting portion 124 is further provided on the end plate body 11. The movable clamping member 122 is detachably connected to the connecting portion 124, and is in turn detachably connected to the end plate body 11, to better achieve the above-mentioned requirement for enabling the movable clamping member 122 to make room for the fixing band.

In this embodiment, the connecting portion 124 and the end plate body 11 are molded by die-casting. A plug-in slot 124a is provided in the connecting portion 124. The plug-in slot 124a preferably has a wedged cross-sectional shape. That is, the cross-sectional area of the plug-in slot 124a in the thickness direction X of the end plate body 11 is gradually decreased. The connecting portion 124 may be formed of a protrusion which protruding from the outer surface 112 of the end plate body 11 in the thickness direction X of the end plate body 11. The connecting portion 124 may be formed of one complete protrusion. Of course, in this embodiment, the connecting portion 124 is preferably formed of four protrusion units 124c. The plug-in slot 124a for connecting with the movable clamping member 122 is formed among the four protrusion units 124c.

Figure 5:
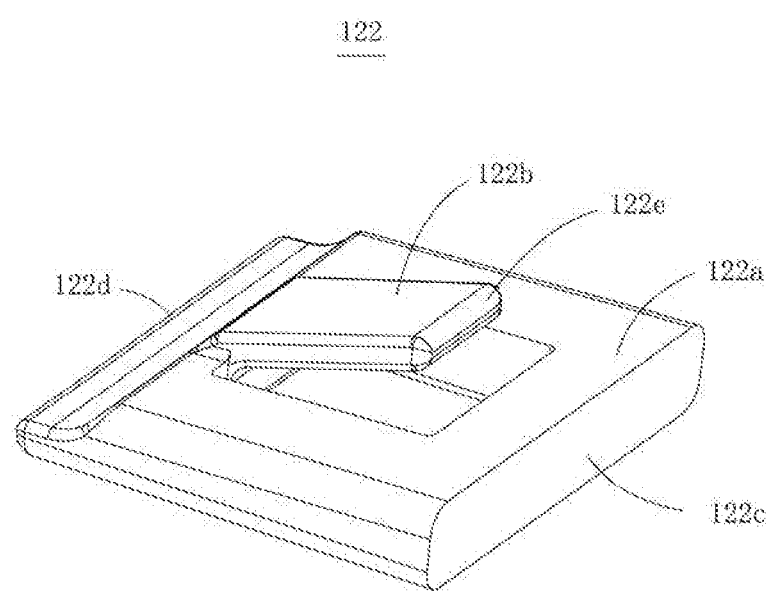
FIG. 5 shows a schematic view of the structure of a movable clamping member according to an embodiment of the disclosure.
Figure 6:
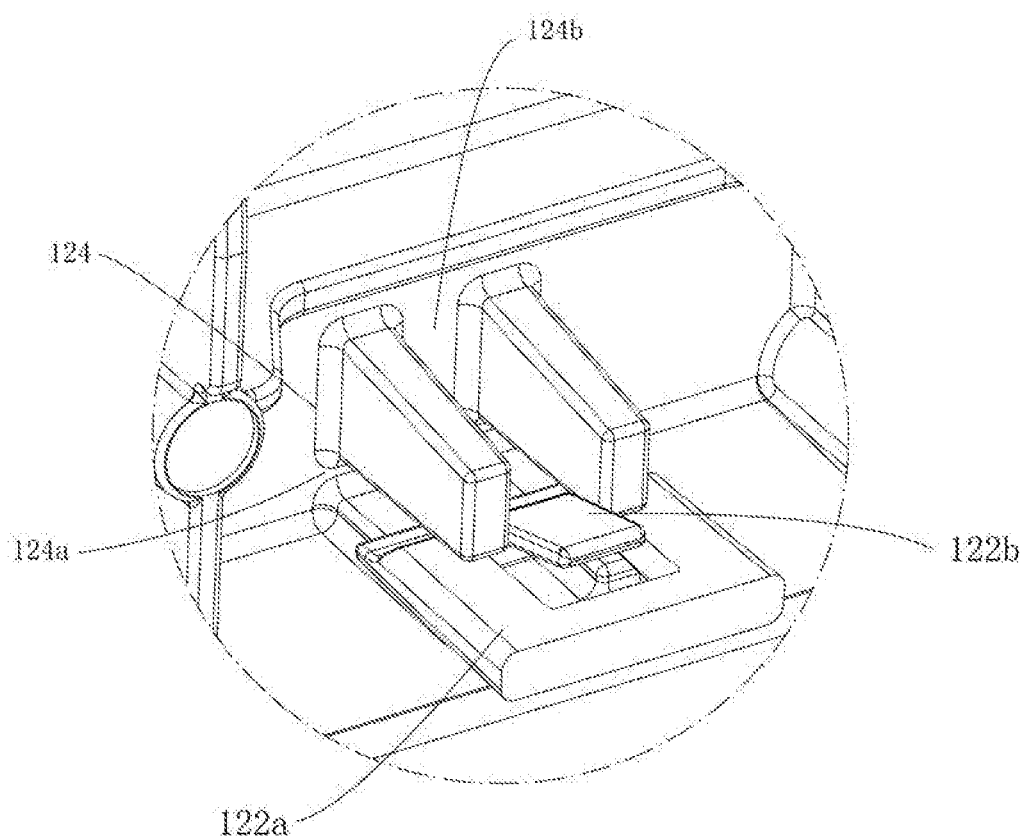
FIG. 6 shows a schematic view of the engagement between the movable clamping member and the connecting portion according to an embodiment of the disclosure.

FIG. 5 shows a schematic view of the structure of the movable clamping member 122 according to an embodiment of the disclosure, and FIG. 6 shows a schematic view of the engagement between the movable clamping member 122 and the connecting portion 124 according to an embodiment of the disclosure. As shown in FIGS. 5 and 6, the movable clamping member 122 has a base 122a which is shaped to match the plug-in slot 124a. Since the plug-in slot 124a has the wedged cross-sectional shape, the base 122a has a wedged block structure as a whole. The base 122a includes a large end surface 122c and a small end surface 122d. The cross-sectional area from the large end surface 122c to the small end surface 122d is gradually decreased. The movable clamping member 122 is detachably connected to the connecting portion 124 by the base 122a and the plug-in slot 124a.

Most of fixing bands in the prior art are ring bodies which are required to be firstly formed and closed and then be sleeved onto the end plate body 11 from the end face in the height direction Y of the end plate body 11. Therefore, when the end plate 1 according to the disclosure is required to be used in cooperation with the fixing band, it is necessary to take out the movable clamping member 122 and then insert the fixing band from the end face of the end plate body 11 in the height direction Y. Due to the provision of the fixed clamping member 121, the fixing band is caught when the fixing band travels to the position where the fixed clamping member 121 is located along the height direction Y of the end plate body 11, and is thereby limited to be stopped at the clamping member space 123. Then, the movable clamping member 122 is connected to the end plate body 11 by the connecting portion 124. Therefore, the clamping to the fixing band is realized, and thereby the movement of the fixing band in the height direction Y of the end plate is effectively prevented and the requirement of resisting the expansion force from the batteries is satisfied.

In addition, since the fixing band is required to be sleeved onto the end plate body 11 from the end face of the end plate body 11 in the height direction Y when being engaged with the end plate, the movable clamping member 122 is preferably located on the side of the end plate body 11 near the end face in the height direction Y to be suitable for different types of fixing bands, so that different types of fixing bands can smoothly enter the clamping space 123 and can be limited by the limiting assembly. Said different types of fixing bands are, for example, manufactured in a closed ring body or formed in a closed ring body by overlapping the two ends only when used in cooperation with the end plate 1.

In order to better ensure reliability of connection between the movable clamping member 122 and the connecting portion 124, as an optional embodiment, the connecting portion 124 further has a limiting slot 124b communicating with the plug-in slot 124a. The limiting slot 124b extends in the height direction Y of the end plate body 11, and is formed by two opposite and adjacent protrusion unit 124c constituting the connecting portion 124. Accordingly, the movable clamping member 122 further includes a stopper 122b which is connected to the base 122a. The stopper 122b has two opposite end portions 122e, wherein one of the end portions 122e is elastically connected to the base 122a and the other of end portions 122e extends in a direction away from the base 122a. The stopper 122b may be engaged with the limiting slot 124b to limit the movement of the movable clamping member 122 in the width direction Z of the end plate body 11. In this embodiment, the stopper 122b may have a flat plate shape, and is provided to face the base 122a in the thickness direction of the base 122a. The stopper 122b has a width smaller than the width of the base 122a. Since the two end surfaces of the stopper 122b in the width direction Z of the end plate body 11 abut against the groove wall of the limiting slot 124b, and the base 122a is engaged with the plug-in slot 124a, the movement of the movable clamping member 122 in both the height direction Y and the width direction Z of the end plate body 11 are limited. That is, the movable clamping member 122 cannot move along the height direction Y and the width direction Z of the end plate body 11.

Figure 7:
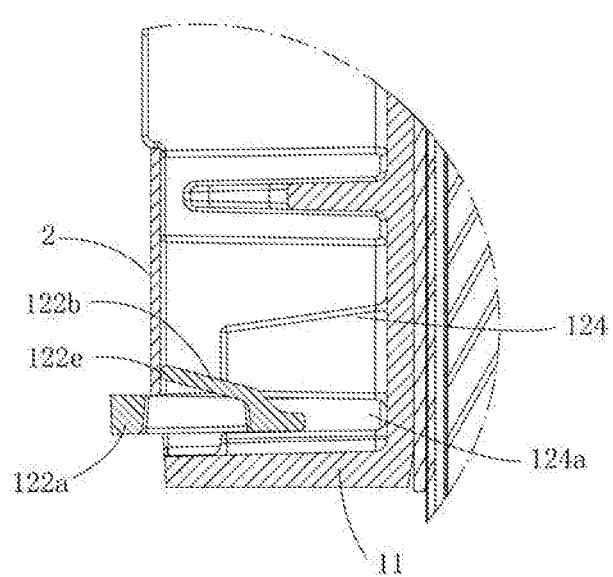
FIG. 7 shows a schematic view of the engagement between the movable clamping member and the fixing band according to an embodiment of the disclosure.

FIG. 7 shows a schematic view of the engagement between the movable clamping member 122 and the fixing band 2 according to an embodiment of the disclosure. As shown in FIG. 7, in the case where the stopper 122b in the free state and is located in the clamping space 123 in the free state, when the end plate 1 is used in cooperation with the fixing band 2 so that the fixing band 2 is limited within the receiving space, the inner side of the fixing band 2 abuts against the end portion 122e of the stopper 122b extending in a direction away from the base 122a. Therefore, the movement of the stopper 122b in the thickness direction X of the end plate body 11 can be limited. Meantime, the reverse force of the stopper 122b acting on the fixing band 2 can tension the fixing band 2 to make engagement between the fixing band 2 and the end plate more reliable. Therefore, when the end plate 1 is applied into the battery module and the movable clamping member 122 is connected to the connecting portion 124, the movements of the movable clamping member 122 in the width direction Z, the height direction Y, and the thickness direction X of the end plate body 11 are limited. Therefore, the reliable connection between the movable clamping member 122 and the connecting portion 124 is effectively ensured, and thereby the stability of the position of the fixing band 2 on the end plate is ensured.

Generally, the number of the fixing bands 2 used in cooperation with the end plate to resist the expansion force from the batteries is two, and the two fixing bands 2 are respectively located at the two ends of the end plate body 11 in the height direction Y. Accordingly, it is preferable that the number of the limiting assemblies in this embodiment is two and the two liming assemblies are spaced apart in the height direction Y of the end plate body 11. In this embodiment, each limiting assembly is located in the middle of the end plate body 11 in the width direction Z and includes one movable clamping member 122. It is understood that the number of the movable clamping members 122 of each limiting assembly is not limited to one, and may be same as or different with the number of the fixed clamping members 121 of the same limiting assembly. The specific number may be adjusted according to the width of the end plate. When the number of the movable clamping members 122 of each limiting assembly is two or more, the two or more movable clamping members 122 are preferably evenly disposed in the width direction Z of the end plate body 11.

As described above, the fixing band 2 is mostly sleeved onto the end plate body 11 from the end surface of the end plate body 11 in the height direction Y. Therefore, as an optional embodiment, as shown in FIGS. 1 to 3, guide inclined surfaces 113 are formed at the two ends of the end plate body 11 in the height direction Y, such that the two end portions (i.e., the top portion and the bottom portion) of the end plate body 11 in the height direction Y are wedge-shaped. Therefore, the guide inclined surfaces 113 may guide the fixing band 2 to fit the fixing band 2 onto the end plate body 11.

Figure 8:
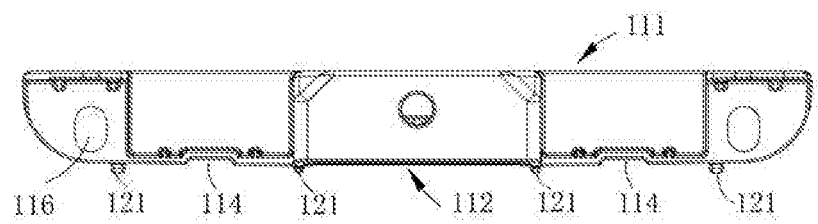
FIG. 8 shows a top view of the structure shown in FIG. 2.
Figure 9:
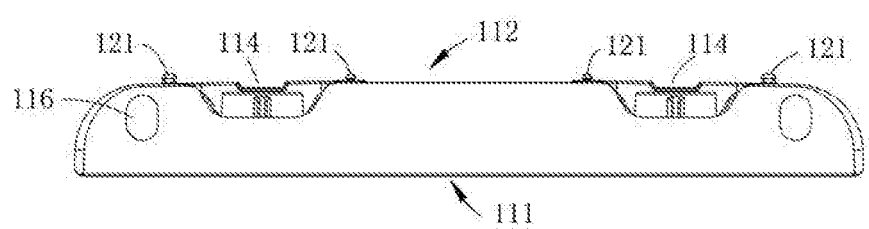
FIG. 9 shows a bottom view of the structure shown in FIG. 2.

FIG. 8 shows a top view of the structure shown in FIG. 2, and FIG. 9 shows a bottom view of the structure shown in FIG. 2. As an optional embodiment, recesses 114 are formed at the two ends of the end plate body 11 in the height direction Y. Said recess 114 is recessed in the thickness direction X of the end plate body 11. One end of the recess 114 penetrates through the end face of the end plate body 11 in the height direction Y. Since the end plate 1 and the battery stack of the battery module are fixed together when the fixing band 2 is assembled, a large force is required to sleeve the fixing band 2 onto the end plate 1. At this time, the corresponding recess 114 can provide a force applying space for the force applying tool, to fit the fixing band 2 into the correspond clamping space 123 on the end plate 1.

Figure 10:
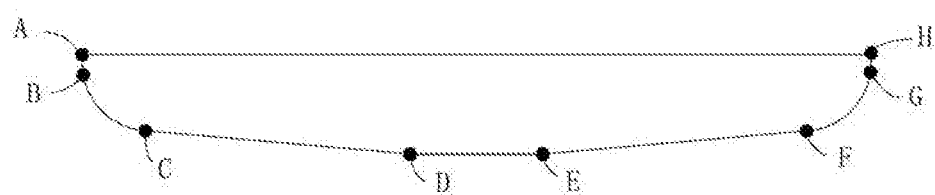
FIG. 10 shows a schematic view of the outline of an end plate for a battery module according to an embodiment of the disclosure.

FIG. 10 shows a schematic view of the outline of the end plate for the battery module according to an embodiment of the disclosure. When the batteries are charged and discharged, the batteries are easy to be expanded, thereby causing the large surface of the battery to expand and deform. Said large surface of the battery refer to the surface provided opposite to the inner surface 111 or the outer surface 112 of the end plate body 11. The expansion force from the battery is transmitted to the end plate 1 and the fixing band 2, so that the fixing band 2 is subjected to a breaking force along its extending direction.

In order to make the fixing band 2 at the position where the fixing band 2 is engaged with the end plate 1 be forced uniformly to avoid stress concentration, as an optional embodiment, with reference to FIG. 10, a portion of the outer surface 112 that can be engaged with the fixing band 2 is entirely an arc surface 115. In this embodiment, the arc surface 115 has a symmetrical structure in the width direction Z of the end plate body 11. The arc surface 115 includes a horizontal segment DE in the middle thereof and component segments AD and EH which are respectively connected to the two sides of the horizontal segment DE. The component segments includes two segments. The component segment AD includes an inclined segment CD, an arc transition segment BC and a vertical segment AB, which are successively arranged in the width direction Z of the end plate body 11. The component segments EH includes an inclined segment EF, an arc transition segment GF and a vertical segment GH, which are successively arranged in the width direction Z of the end plate body 11.

The inclined segment CD and the inclined segment EF are each connected to the horizontal segment DE. The vertical segment AB and the vertical segment GH are parallel to each other and fit the long side of the fixing band 2. Said long side refers to the side intersecting the outer surface 112 of the end plate body 11. The arc transition segment BC and the arc transition segment GF each fit the arc portion of the fixing band 2. A certain angle is formed respectively between the inclined segment CD and the horizontal segment DE, and between the inclined segment EF and the horizontal segment DE. The value of the angle is not particularly limited, preferably within the range of 0°-10°, but is not limited thereto. With the above provision, the cross-sectional shape of the arc surface 115 is similar to the shape of the fixing band 2 when stretched. Therefore, the expansion force from the individual batteries can be more uniformly transmitted to the fixing band 2, thereby the service life of the fixing band 2 is improved and the overall safety performance of the battery module is ensured.

Figure 11:
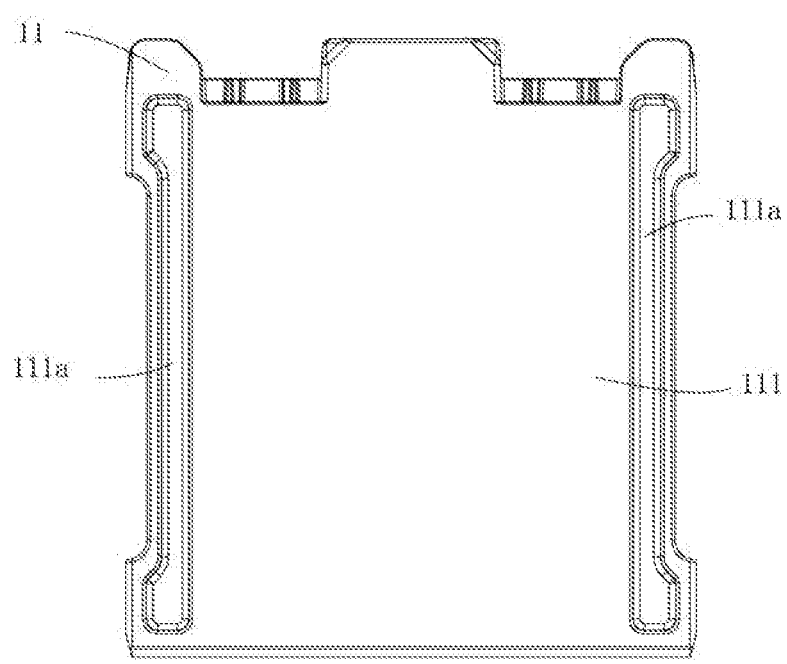
FIG. 11 shows a rear view of the structure shown in FIG. 2.

FIG. 11 shows a rear view of the structure shown in FIG. 2. When structural adhesive is required to be coated among the individual batteries of the battery stack and between the battery stack and the end plate, the structural adhesive may overflow when the battery modules are packed. Therefore, as an optional embodiment, with reference to FIG. 11, an adhesive overflow groove 111a is provided in the inner surface 111 of the end plate body 11. The adhesive overflow groove 111a extends in the height direction Y of the end plate body 11. The provision of the adhesive overflow groove 111a enables to guide excess structural adhesive into the adhesive overflow groove 111a when the battery modules are packed, so as to prevent the structural adhesive from overflowing onto the packing tooling, thereby saving the cleaning time of the packing tooling of the battery module and improving the production efficiency. The number of adhesive overflow grooves 111a may be set according to requirements, preferably two. The two adhesive overflow grooves 111a are disposed on the two sides of the end plate body 11 in the width direction Z, so that the requirement of collecting adhesive can be satisfied while the strength of the end plate 1 and the requirement of packing the battery modules are not affected.

With reference to FIG. 1, since the end plate body 11 and the fixed clamping member 121 are molded by die casting, the structure and shape thereof may be varied. Therefore, in order to achieve the lightweight requirement of the end plate 1 while ensuring the load-bearing capacity of the end plate 1, as an optional embodiment, weight reducing grooves 112a and reinforcing ribs 112b are also provided on the outer surface 112 of the end plate body 11. Therefore, the strength requirement of the end plate 1 can be ensured while the lightweight requirement can be satisfied. The weight reducing groove 112a and the reinforcing rib 112b may be simultaneously provided on the outer surface 112 of the end plate body 11, or may be provided separately as long as the lightweight requirement and/or strength requirement of the end plate 1 can be satisfied.

Meanwhile, in order to facilitate lifting when the battery modules are packed, lifting holes 112c are provided on the outer surface 112 of the end plate body 11, for hooking the lifting accessory. In addition, connecting holes 116 are provided in the end plate body 11. The connecting hole 116 penetrates the end plate body 11 in the height direction Y. The connecting hole 116 is a waist-type hole. The connecting hole 116 can facilitate fixing the battery module as a whole and can adjust the mounting size of the battery module in the length direction.

Figure 12:
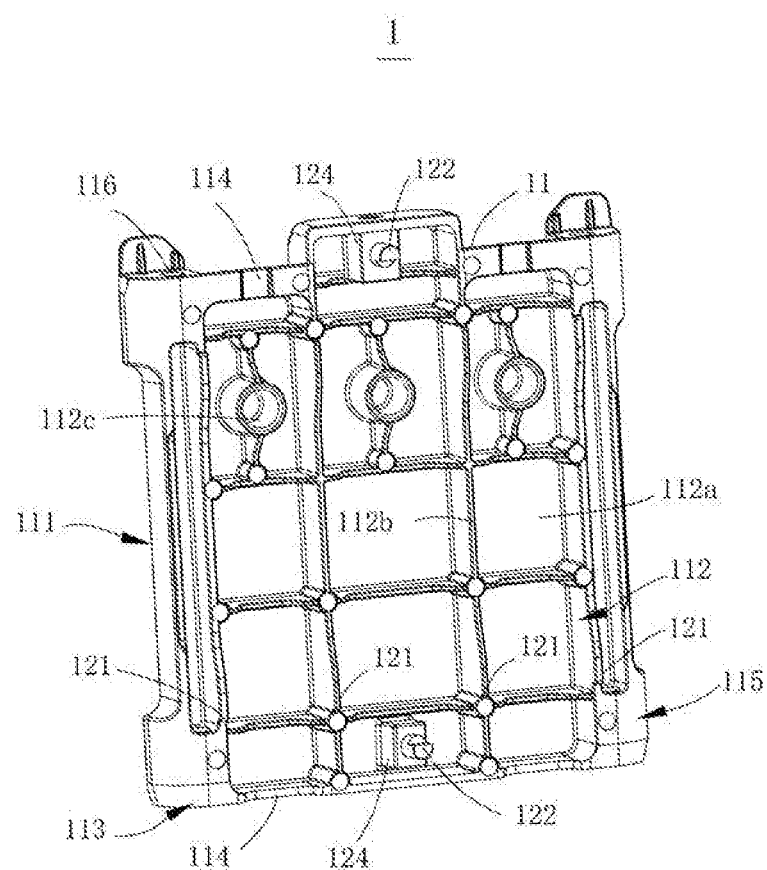
FIG. 12 shows a schematic diagram of the structure of an end plate for a battery module according to another embodiment of the disclosure.

The movable clamping member 122 according to the above embodiments is detachably connected to the connecting portion 124, and can satisfy the requirements of yielding and limiting the fixing band 2. Of course, it is not limited to the above arrangement. FIG. 12 shows a schematic diagram of the structure of an end plate for a battery module according to another embodiment of the disclosure. With reference to FIG. 12, in this embodiment, the movable clamping member 122 is connected to the end plate body 11 by the connecting portion 124. The connecting portion 124 may be formed by a protrusion protruding the outer surface 112 of the end plate body 11 in the thickness direction X. The connecting portion 124 and the end plate body 11 may be molded by die casting. The connecting portion 124 has a plug-in slot 124a. The plug-in slot 124a preferably has a conical cross-sectional shape, i.e., the cross-sectional area of the plug-in slot 124a is gradually decreased along the thickness direction X of the end plate body 11. The plug-in slot 124a is preferably disposed at the center of the connecting portion 124. The movable clamping member 122 has a latch structure which is shaped to match the plug-in slot 124a. The movable clamping member 122 is elastically connected to the connecting portion 124. Specifically, the movable clamping member 122 may be connected to the connecting portion 124 by an elastic member such as a spring. The spring is preferably located in the plug-in slot 124a and the two ends may be connected to the groove wall of the plug-in slot 124a and the outer peripheral surface of the movable clamping member 122, respectively.

When the end plate 1 is required to be used in cooperation with the fixing band 2, the movable clamping member 122 is compressed under the force applied in the thickness direction X of the end plate body 11, thereby realizing the requirement of making room for the fixing band 2. When the fixing band 2 is fitted into the clamping space 123, the force acting on the movable clamping member 122 is withdrawn, and under the action of the elastic member, the movable clamping member 122 protrudes in the thickness direction X of the end plate body 11, thereby achieving the clamping to the fixing band 2.

Figure 13:
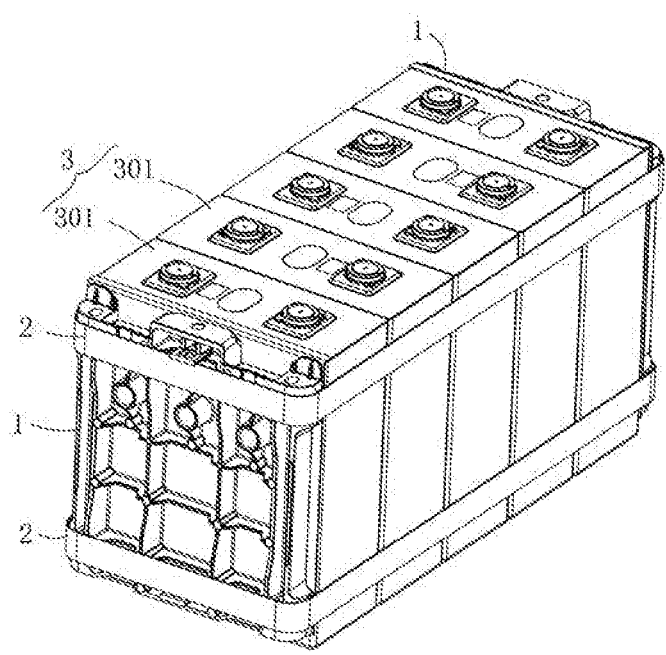
FIG. 13 shows a schematic diagram of the structure of a battery module according to an embodiment of the disclosure.

FIG. 13 shows a schematic view of the structure of a battery module according to an embodiment of the disclosure. With reference to FIG. 13, this embodiment of the disclosure provides a battery module. The battery module includes a battery stack 3, two end plates 1 according to each of the above embodiments, and the fixing band 2. The battery stack 3 includes a plurality of batteries 301 which are disposed to be stacked. The two end plates 1 are spaced from each other and disposed to sandwich the battery stack 3. The fixing band 2 is disposed around the battery stack 3 and the two end plates 1, and is engaged with the outer surface 112. The fixing band 2 is received in the clamping space 123.

In the battery module according to the embodiments of the disclosure, the battery module comprises the end plate 1 according to the above-mentioned embodiments. Therefore, when the battery modules are packed, the assembly of the fixing band 2 and the end plate 1 are facilitated and the position of the fixing band 2 on the end plate 1 is limited. Consequently, the movement of the fixing band 2 is prevented, the requirement of resisting the expansion force from the batteries 301 is satisfied, and a better safety performance is obtained.

Although the disclosure has been described with reference to preferred embodiments, various modifications may be made thereto and components thereof may be replaced with equivalents without departing from the scope of the disclosure. In particular, the technical features mentioned in the various embodiments may be combined in any manner as long as there is no structure conflict. The disclosure is not limited to the specific embodiments disclosed herein, but includes all technical solutions falling within the scope of the claims.

REFERENCE NUMERALS

X thickness direction
Y height direction
Z width direction
1 end plate
11 end plate body
111 inner surface
111a adhesive overflow groove
112 outer surface
112a weight reducing groove
112b reinforcing rib
112c lifting hole
113 guide inclined surface
114 recess
115 arc surface
DE horizontal segment
AD, EH component segment
CD, EF inclined segment
BC, FG arc transition segment
AB, HG vertical segment
116 connecting hole
121 fixed clamping member
122 movable clamping member
122a base 122b stopper
122c large end surface
122d small end surface
122e end portion
123 clamping space
124 connecting portion
124a plug-in slot
124b limiting slot
124c protrusion unit.
2 fixing band
3 battery stack
301 battery

What is claimed is:

1. An end plate for a battery module, comprising:
an end plate body, which has an inner surface and an outer surface that are opposed to each other in a thickness direction of the end plate body, wherein the outer surface is engaged with a fixing band for the battery module; and
a limiting assembly, which is disposed on the outer surface, wherein the limiting assembly includes a fixed clamping member and a movable clamping member which are spaced apart from each other in a height direction of the end plate body and are used in cooperation with each other, a clamping space for receiving the fixing band is formed between the fixed clamping member and the movable clamping member, and the movable clamping member can make room for the fixing band so that the fixing band enters the clamping space by the movable clamping member and is limited within the clamping space.

2. The end plate according to claim 1, wherein the fixed clamping member protrudes from the end plate body in the thickness direction and is integral with the end plate body.

3. The end plate according to claim 1, wherein a connecting portion is provided on the outer surface, and the movable clamping member is detachably or elastically connected with the connecting portion.

4. The end plate according to claim 3, wherein the movable clamping member is detachably connected with the connecting portion, a plug-in slot is provided in the connecting portion, the movable clamping member has a base which is shaped to match the plug-in slot, and the movable clamping member is detachably connected with the connecting portion by the base and the plug-in slot.

5. The end plate according to claim 4, wherein the connecting portion further has a limiting slot communicating with the plug-in slot, the movable clamping member further comprises a stopper connected to the base, the stopper has two end portions which are opposite, wherein one of the end portions is elastically connected to the base and the other of the end portions extends in a direction away from the base, and the stopper is engaged with the limiting slot to limit movement of the movable clamping member in a width direction of the end plate body.

6. The end plate according to claim 1, wherein the number of the limiting assemblies is two and the two limiting assemblies are spaced apart from each other in the height direction, and the movable clamping member is located at a side of the end plate body near the end face in the height direction.

7. The end plate according to claim 1, wherein guide inclined surfaces are formed at two ends of the end plate body in the height direction; and/or
recesses are formed at the two ends of the end plate body in the height direction to provide a force applying space for a force applying tool.

8. The end plate according to claim 1, wherein a portion of the outer surface that is fitted with the fixing band is an arc surface.

9. The end plate according to claim 8, wherein the arc surface includes a horizontal segment which is located in the middle and component segments which are respectively connected to two sides of the horizontal segment, each of the component segments includes an inclined segment, an arc transition segment, and a vertical segment which are successively arranged in a width direction of the end plate body, the inclined segment is connected to the horizontal segment.

10. The end plate according to claim 1, wherein an adhesive overflow groove is provided on the inner surface and extends in the height direction.

11. The end plate according to claim 1, wherein the end plate body and the fixed clamping member are molded by die casting, and a weight reducing groove and/or a reinforcing rib is provided on the outer surface.

12. A battery module, comprising:
a battery stack, which includes a plurality of batteries that are disposed to be stacked;
two end plates according to claim 1, the two end plates are spaced apart from each other and are disposed to sandwich the battery stack; and
a fixing band, which is disposed around the battery stack and the two end plates and is engaged with the outer surface,
wherein the fixing band is received in the clamping space.

* * * * *